3,031,473
OPTIONALLY 17-ALKYLATED AND 6-METHYLATED 5α-ANDROST-1-ENE 3β,17β-DIOL AND ESTERS THEREOF

Frank B. Colton, Chicago, Ill., assignor to G. D. Searle & Co., Chicago, Ill., a corporation of Delaware
No Drawing. Filed July 18, 1960, Ser. No. 43,303
11 Claims. (Cl. 260—397.5)

The present invention relates to compounds of the formula

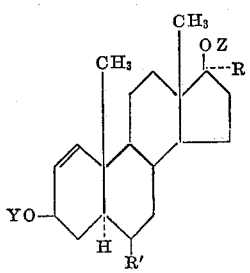

wherein Y and Z represent hydrogen or alkanoyl radicals, R' represents hydrogen or a methyl group, and R represents hydrogen or an alkyl radical.

Among the alkanoyl radicals represented by Y and Z, especially lower alkanoyl radicals are preferred; these may be represented as RCO—. Among the alkyl radicals represented by R, especially lower alkyl radicals are preferred, which is to say methyl, ethyl, propyl, isopropyl, butyl, isobutyl, sec-butyl, tert-butyl, pentyl, isopentyl, tert-pentyl, neopentyl, hexyl, isohexyl, heptyl, octyl and like $C_nH_{2n+1}$ radicals wherein $n$ represents an integer amounting to less than 9.

The compounds of this invention are conveniently prepared from the corresponding 3-ketones by hydride reduction; embodiments lacking 17-alkyl substitution are alternatively prepared by reduction of the corresponding 3,17-dione. Lithium aluminum hydride, sodium borohydride, and lithium tri-t-butoxyaluminohydride are especially useful for these reductions. The ketonic precursors for the embodiments possessing the 6β-methyl substituent are prepared by a route which begins with a Beckmann rearrangement of the oxime of 3β-acetoxy-6-methyl-pregna-5,16-dien-20-one; the resultant 3β-acetoxy-6-methylandrost-5-en-17-one is subjected to catalytic hydrogenation to give 3β-acetoxy-6β-methyl-5α-androst-17-one. The latter compound is cleaved to the free alcohol, which is than oxidized with chromic acid to give 6β-methyl-5α-androstane-3,17-dione; the diketone is brominated to give 2-bromo-6β-methyl-5α-androstane-3,17-dione, which is then subjected to dehydrobromination to give the requisite 6β-methyl-5α-androst-1-ene-3,17-dione.

The compounds of this invention are useful because of their valuable pharmacological properties. In particular they are anabolic agents of low androgenicity.

This invention is further illustrated by the following examples, which should not be construed as limiting it in spirit or scope. Quantities are given as parts by weight, and temperatures are in degrees centigrade.

Example 1

*5α-androst-1-ene-3β,17β-diol.*—To a solution of 3 parts of sodium borohydride in 180 parts of ethyl acetate is added a solution of 10 parts of androst-1-ene-3,17-dione in 9 parts of ethyl acetate, and then 24 parts of methanol is added slowly; evolution of a gas occurs. The mixture thus obtained is allowed to stand for one hour, and then a solution composed of 10 parts of acetic acid in 180 parts of ethyl acetate is added until the pH is 7, whereupon 680 parts of ethyl acetate is added. The resultant mixture is extracted several times with water; the organic layer thus purified is concentrated by distillation of the solvents until crystallization begins. Chilling the concentrated solution thus obtained causes crystallization of 5α-androst-1-ene-3β,17β-diol. The product is isolated by filtration, washed with acetone, and dried at 80°. The pure compound crystallizes as a sesquihydrate melting at about 122–123°. The anhydrous material obtained by melting and resolidification of the hydrate melts at 154–156°. Absorption bands in the infrared spectrum are observed at 2.86, 2.92, 9.32, 9.45, and 9.73 microns. The structure may be expressed as

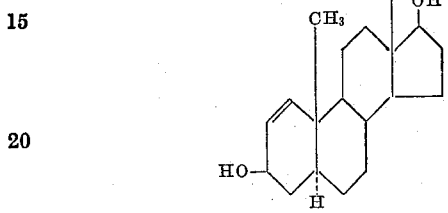

Example 2

*17α-methyl-5α-androst-1-ene-3β,17β-diol.*—To a stirred ice-cold suspension of 2 parts of lithium aluminum hydride in 140 parts of anhydrous ether is added a solution of 6 parts of 17α-methyl-5α-androst-1-en-17β-ol-3-one in 150 parts of tetrahydrofuran and 110 parts of ether. The reaction mixture thus obtained is stirred at room temperature for 90 minutes, and then the excess lithium aluminum hydride is decomposed by addition of ethyl acetate. A saturated aqueous solution of sodium sulfate is added, and the resultant layered mixture is shaken, and then filtered. Evaporation of the solvents from the organic layer gives a crude, crystalline residue of 17α-methyl-5α-androst-1-ene-3β,17β-diol. Recrystallization of this crude material affords the pure product, melting at approximately 214–215°. The rotation in chloroform is +17°. The structure may be expressed as

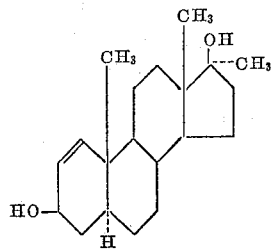

Example 3

*17α-ethyl-5α-androst-1-ene-3β,17β-diol.*—To a stirred suspension of 24 parts of lithium aluminum hydride in 710 parts of anhydrous ether is added slowly a solution of 24 parts of 17α-ethyl-5α-androst-1-en-17β-ol-3-one in 710 parts of ether, and the resultant reaction mixture is then stirred at room temperatures for 3 hours. At the end of this time ice water is added to destroy excess lithium aluminum hydride, followed by addition of dilute hydrochloric acid. The phases of the resultant layered mixture are separated, the aqueous phase is extracted several times with ether and these extracts are added to the organic phase. The ether solution thus obtained is washed successively with dilute hydrochloric acid, aqueous sodium bicarbonate solution, and water, and then dried over potassium carbonate; distillation of the solvent leaves a crude crystalline residue of 17α-ethyl-5α-androst-1-ene-3β,17β-diol. The crude product thus obtained is purified by successive recrystallizations; the resultant pure material melts at 208–211°, and has a specific rotation in chloroform of +28°. The structure may be expressed as

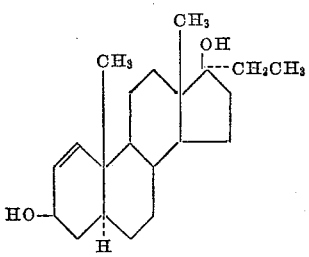

Example 4

*3β - acetoxy - 17α-methyl-5α-androst-1-ene-17β-ol.*—A solution of 12 parts of 17α-methyl-5α-androst-1-ene-3β,17β-diol in 30 parts of acetic anhydride and 300 parts of pyridine is allowed to stand at room temperatures for 24 hours. At the end of this time the reaction mixture is poured into ice water. The resultant mixture is extracted with ether; the ether solution is washed with dilute hydrochloric acid, 5% aqueous sodium carbonate solution and water, and dried over anhydrous sodium sulfate. The solvent is evaporated from the resultant solution, and the residue thus obtained is recrystallized several times to give pure 3β-acetoxyl-17α-methyl-5α-androst-1-en-17β-ol melting at 132–134°; the specific rotation in chloroform is +16.5°. The structure may be expressed as

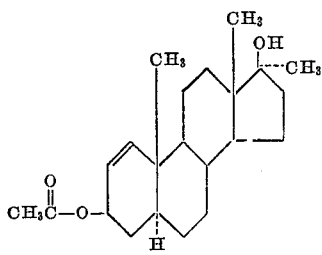

Example 5

*3β - propionoxy - 17α-methyl-5α-androst-1-en-17β-ol.*—Substitution of 38 parts of propionic anhydride for the acetic anhydride called for in the preceding Example 4 affords, by the procedure therein detailed, 3β-propionoxy-17α-methyl-5α-androst-1-en-17β-ol, the structure of which may be expressed as

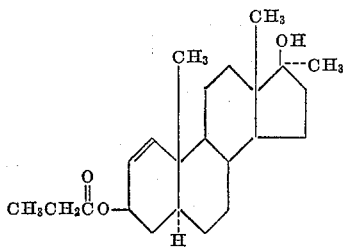

Example 6

*3β-acetoxy-17α-ethyl-5α-androst-1-en-17β-ol.*—A solution of 10 parts of 17α-ethyl-5α-androst-1-ene-3β,17-diol in 50 parts of acetic anhydride and 100 parts of dry pyridine is allowed to stand for 20 hours at room temperatures. At the end of this time the reaction mixture is poured into 1500 parts of ice water; the resultant precipitate is taken up in ether, and the ether solution is washed successively with dilute hydrochloric acid, aqueous sodium carbonate solution and water. The solution thus obtained is dried over potassium carbonate, and then the solvents are evaporated. The resultant crude residue of 3β-acetoxy-17α-ethyl-5α-androst-1-en-17β-ol is subjected to successive recrystallizations to give the pure product melting at 148–150°, and having a specific rotation in chloroform of +20°. The structure may be expressed as

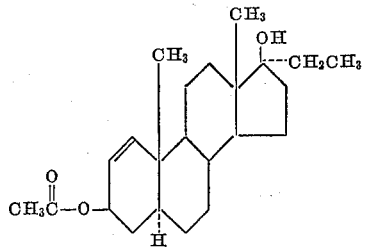

Example 7

*3β - propionoxy - 17α-ethyl-5α-androst-1-ene-17β-ol.*—Substitution of 63 parts of propionic anhydride for the acetic anhydride called for in the preceding Example 6 affords, by the procedure therein detailed, 3β-propionoxy-17α-ethyl-5α-androst-1-en-17β-ol, the structure of which may be expressed as

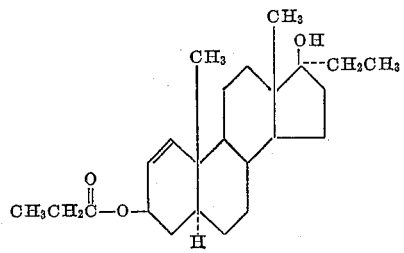

Example 8

*3β,17β-diacetoxy-6β-methyl-5α-androst-1-ene.*—A mixture of 50 parts of 3β-acetoxy-6-methylpregna-5,16-dien-20-one, 10 parts of hydroxylamine hydrochloride and 490 parts of pyridine is stirred at 95° for 3 hours. At the end of this time the reaction mixture is cooled to −3°, and a solution of 104 parts of phosphorus oxychloride in 490 parts of pyridine is added; the temperature rises to about 28° during the addition, and then returns to about 0°. The resultant mixture is stirred at about 0° for 2½ hours, and then poured into a mixture of about 1000 parts of concentrated hydrochloric acid and 1000 parts of ice at such a rate that the temperature does not exceed 50°. The mixture thus obtained is stirred for 10 minutes, and the liquid layer is decanted from the precipitate which forms. Water is added, and the resultant mixture is allowed to stand overnight. The water layer is removed by decantation, and the residue is taken up in ethyl acetate, the organic solution is washed successively with water, aqueous sodium bicarbonate, water and aqueous sodium chloride, and then dried over anhydrous sodium sulfate. The solvent is evaporated at diminished pressure, and the residue is taken up in 158 parts of methanol. The solution thus obtained is chilled, whereupon precipitation occurs. The precipitate is removed by filtration to give 3β-acetoxy-6-methylandrost-5-en-17-one, melting at about 151–152°. The specific rotation is −19.0°. The infrared spectrum shows bands at 5.73, 7.26, 7.99, and 9.70 microns. The structure may be expressed as

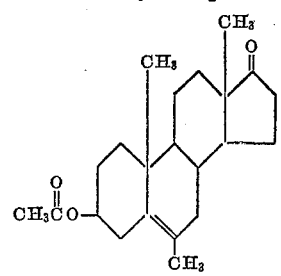

A mixture of 200 parts of 3β-acetoxy-6-methylandrost-5-en-17-one, 1,575 parts of glacial acetic acid and 40 parts of 5% palladium-on-charcoal is treated with hydrogen at 20–25 pounds per square inch until a volume of hydrogen 10% in excess of theory is absorbed. The resultant mixture is subjected to filtration, and cold water is added to the filtrate until a crystalline precipitate forms. The mixture thus obtained is cooled to about 0° for 2 hours, and the resultant precipitate is removed by filtration. The 3β-acetoxy-6β-methyl-5α-androstan-17-one thus obtained melts at 151–157°. The structure may be expressed as

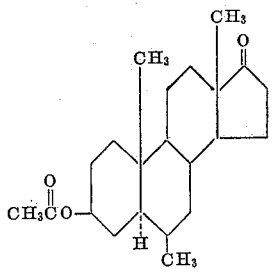

A mixture of 80 parts of 3β-acetoxy-6β-methyl-5α-androstan-17-one, 1,470 parts of methanol and 119 parts of concentrated hydrochloric acid is heated under reflux for 3 hours. The resultant solution is cooled with an ice bath, and water is added slowly to promote crystallization. The solid material which forms is removed by filtration, and recrystallized from acetone to give 6β-methyl-5α-androstan-3β-ol-17-one, melting at about 157–158°. The structure may be expressed as

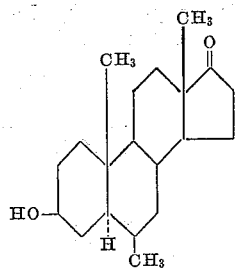

To a solution of 57 parts of 6β-methyl-5α-androstan-3β-ol-17-one in 1027 parts of acetone is added slowly with stirring a solution of 267 parts of chromium trioxide in 1000 parts of water and 423 parts of concentrated sulfuric acid until the reaction mixture assumes the color of the chromic acid solution. To the resultant reaction mixture is added a small amount of isopropyl alcohol to destroy the slight excess of chromic acid, and to the mixture thus obtained is added 30 parts of water. The organic layer is separated by decantation, and to this is added 10,000 parts of water. The resultant mixture is cooled to 0°, whereupon precipitation occurs. The precipitate is removed by filtration, washed with water, and recrystallized from aqueous methanol to give 6β-methyl-5α-androstane-3,17-dione, melting at 171–173°. The structure may be expressed as

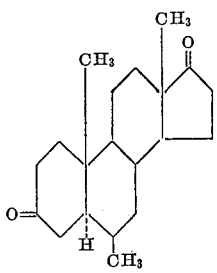

To a solution of 107 parts of 6β-methyl-5α-androstane-3,17-dione in 2625 parts of acetic acid is added 2 parts of a saturated solution of hydrogen bromide in acetic acid. To the solution thus obtained is added with stirring a solution of 117 parts of bromine in 1260 parts of acetic acid. To the resultant reaction mixture is added 3000 parts of water, whereupon a precipitate forms. The solid material is removed by filtration, to give 2-bromo-6β-methyl-5α-androstane-3,17-dione, melting at 193–195°, with decomposition. The structure may be expressed as

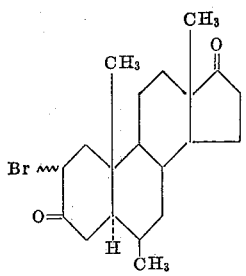

A solution of 80 parts of 2-bromo-6β-methyl-5α-androstane-3,17-dione in 300 parts of collidine is heated under reflux in a nitrogen atmosphere for 12 minutes, and then cooled to 0°. The reaction mixture is extracted with ether, and the ether layer is washed with 1 N sulfuric acid until acidic; the acidic ethereal solution is washed several times with saturated aqueous sodium chloride, and then dried over anhydrous sodium sulfate. The resultant ether solution is stripped to dryness with a nitrogen stream, and the residue is subjected to chromatography over silica gel, using benzene-ethyl acetate as eluants. Elution with approximately 5% ethyl acetate-95% benzene gives 6β-methyl-5α-androst-1-ene-3,17-dione, which is recrystallized from aqueous methanol; the melting point is 141–144°. The structure may be expressed as

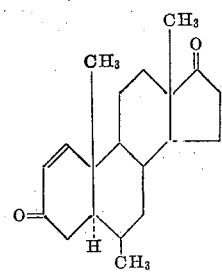

To a solution of 50 parts of 6β-methyl-5α-androst-1-ene-3,17-dione in 1580 parts of isopropyl alcohol is added a solution of 50 parts of sodium borohydride in 790 parts of isopropyl alcohol and 500 parts of water; after 2 minutes an additional 500 parts of water is added. The resultant mixture is allowed to stand at room temperatures for 20 minutes, and then 790 parts of isopropyl alcohol is added. The mixture thus obtained is heated on a steam bath, and an additional 1500 parts of water is added slowly; the reaction mixture is cooled to room temperature, and decomposed by addition of 1300 parts of a 1:1 mixture of acetic acid and water. The resultant mixture is cooled to 0°, and then filtered. The solid material is washed with water, and taken up in benzene; the benzene is removed by evaporation to give 6β-methyl-5α-androst-1-ene-3β,17β-diol, as an oil. The structure may be expressed as

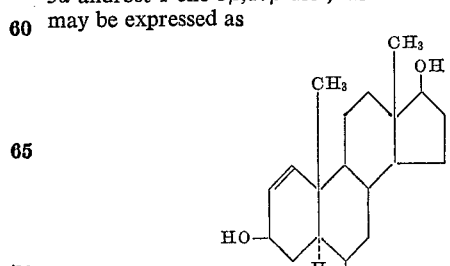

A mixture of 10 parts of 6β-methyl-5α-androst-1-ene-3β,17β-diol, 76 parts of acetic anhydride and 69 parts of pyridine is heated at about 73° for 1 hour. At the end of this time ice is added, the resultant mixture is allowed to stand for 30 minutes, and then the aqueous layer is removed by decantation. The residue is recrystallized twice from aqueous methanol to give 3β,17β-diacetoxy-6β-methyl-5α-androst-1-ene, melting at 122–132°. The structure may be expressed as

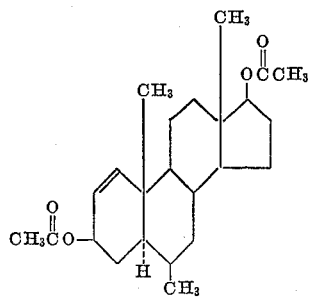

*Example 9*

*3β,17β - dipropionoxy - 6β - methyl-5α-androst-1-ene.—* Substitution of 97 parts of propionic anhydride for the acetic anhydride of the preceding example gives, by the procedure therein detailed, 3β,17β - dipropionoxy - 6β-methyl-5α-androst-1-ene. The structure may be expressed as

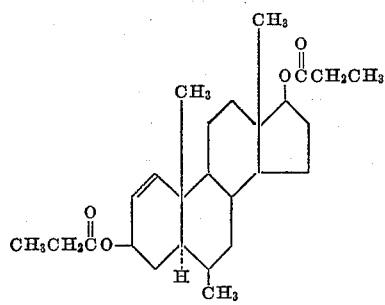

What is claimed is:
1. 5α-androst-1-ene-3β,17β-diol.
2. 6β-methyl-5α-androst-1-ene-3β,17β-diol.
3. A compound of the formula

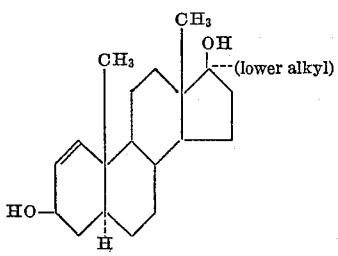

4. 17α-methyl-5α-androst-1-ene-3β,17β-diol.
5. 17α-ethyl-5α-androst-1-ene-3β,17β-diol.
6. A compound of the formula

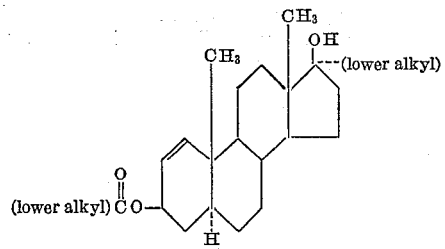

7. 3β-acetoxy-17α-methyl-5α-androst-1-en-17β-ol.
8. 3β-acetoxy-17α-ethyl-5α-androst-1-en-17β-ol.
9. A compound of the formula

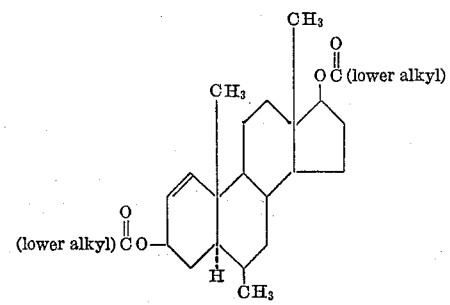

10. 3β,17β-diacetoxy-6β-methyl-5α-androstal-1-ene.
11. A compound of the formula

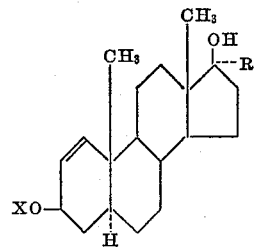

wherein R is selected from the group consisting of hydrogen and lower alkyl, X is selected from the group consisting of hydrogen and lower alkanoyl when R is lower alkyl, and X is hydrogen when R is hydrogen.

No references cited.